(12) United States Patent  (10) Patent No.: US 9,250,823 B1
Kamat et al.  (45) Date of Patent: Feb. 2, 2016

(54) ONLINE REPLACEMENT OF PHYSICAL STORAGE IN A VIRTUAL STORAGE SYSTEM

(71) Applicant: EMC Corporation, Hopkinton, MA (US)

(72) Inventors: Mahesh Kamat, Milpitas, CA (US); Shuang Liang, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 86 days.

(21) Appl. No.: 14/282,318

(22) Filed: May 20, 2014

(51) Int. Cl.
*G06F 12/02* (2006.01)
*G06F 3/06* (2006.01)

(52) U.S. Cl.
CPC ............ *G06F 3/0647* (2013.01); *G06F 3/0619* (2013.01); *G06F 3/0643* (2013.01); *G06F 3/0689* (2013.01)

(58) Field of Classification Search
CPC ... G06F 3/0647; G06F 3/0619; G06F 3/0643; G06F 3/0689
USPC .......... 711/114, 154, 156, 203, 206; 707/697, 707/809, 810; 714/4.12, 6.22, 6.24, 6.32
See application file for complete search history.

(56) References Cited

U.S. PATENT DOCUMENTS

| | | | | |
|---|---|---|---|---|
| 5,546,557 A * | 8/1996 | Allen | ................... | G06F 3/0601 360/49 |
| 5,809,511 A * | 9/1998 | Peake | ................... | G06F 3/0605 |
| 6,920,511 B2 * | 7/2005 | Sicola | ................... | G06F 3/0601 |
| 7,424,592 B1 * | 9/2008 | Karr | ................... | G06F 3/0605 710/100 711/203 |
| 7,603,530 B1 * | 10/2009 | Liikanen | ............. | G06F 11/2084 711/156 |
| 7,620,772 B1 * | 11/2009 | Liikanen | ............... | G11B 27/322 711/112 |
| 7,685,360 B1 * | 3/2010 | Brunnett | ............... | G06F 3/0608 360/31 |
| 8,473,566 B1 * | 6/2013 | Cardente | ................. | G06F 3/061 370/252 |
| 8,621,059 B1 * | 12/2013 | Kong | .................... | G06F 13/385 709/223 |
| 8,856,191 B2 * | 10/2014 | Ben-Tsion | ............ | G06F 17/303 707/802 |
| 8,924,675 B1 * | 12/2014 | Burke | ................... | G06F 3/0647 711/156 |
| 8,943,266 B2 * | 1/2015 | Koseki | .................. | G06F 11/108 711/103 |
| 2013/0275447 A1 * | 10/2013 | Ben-Tsion | ........ | G06F 17/30079 707/756 |
| 2014/0281168 A1 * | 9/2014 | Koseki | .................. | G06F 11/108 711/103 |

* cited by examiner

*Primary Examiner* — Stephen Elmore

(74) *Attorney, Agent, or Firm* — Barry N. Young

(57) ABSTRACT

Physical storage is replaced online in a data integrity storage system comprising RAID groups of physical disks in separate enclosures (shelves). All disks of a RAID group are located on a corresponding shelf, and each shelf is mapped by an internal file system to a separate independent logical address space partitioned into a plurality of blocks forming a blockset containing data and metadata. Source shelf disk data is moved online to disks of a target shelf using invulnerable data movement that ensures the integrity of the data, and source shelf blockset metadata is migrated to a corresponding target shelf blockset. After verifying the correctness of the target data and metadata, the source shelf and blockset are removed.

17 Claims, 6 Drawing Sheets

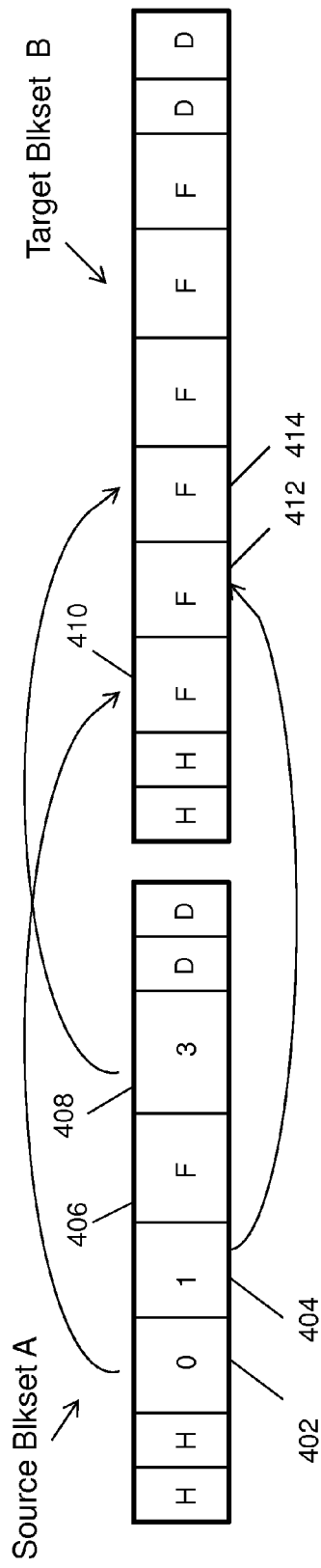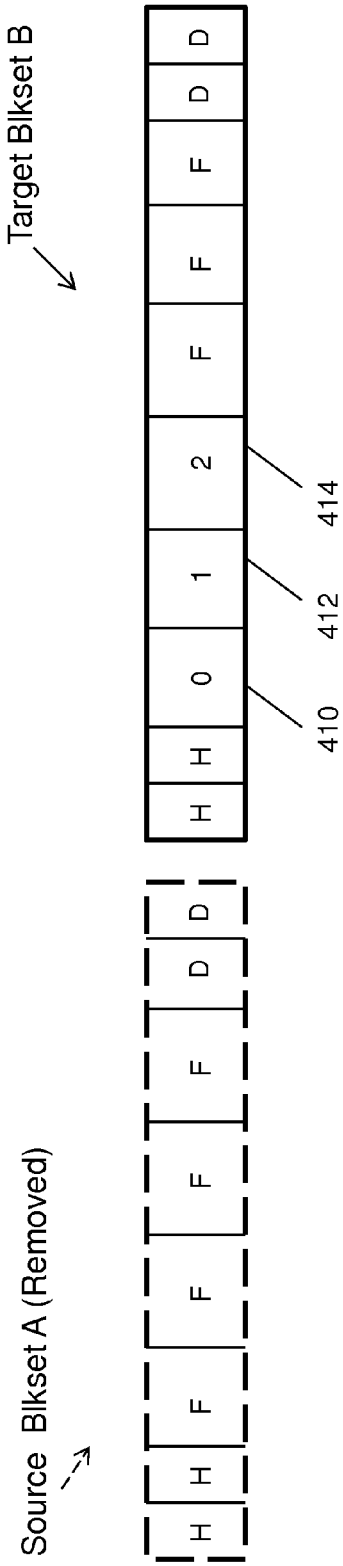
Figure 4A
Figure 4B

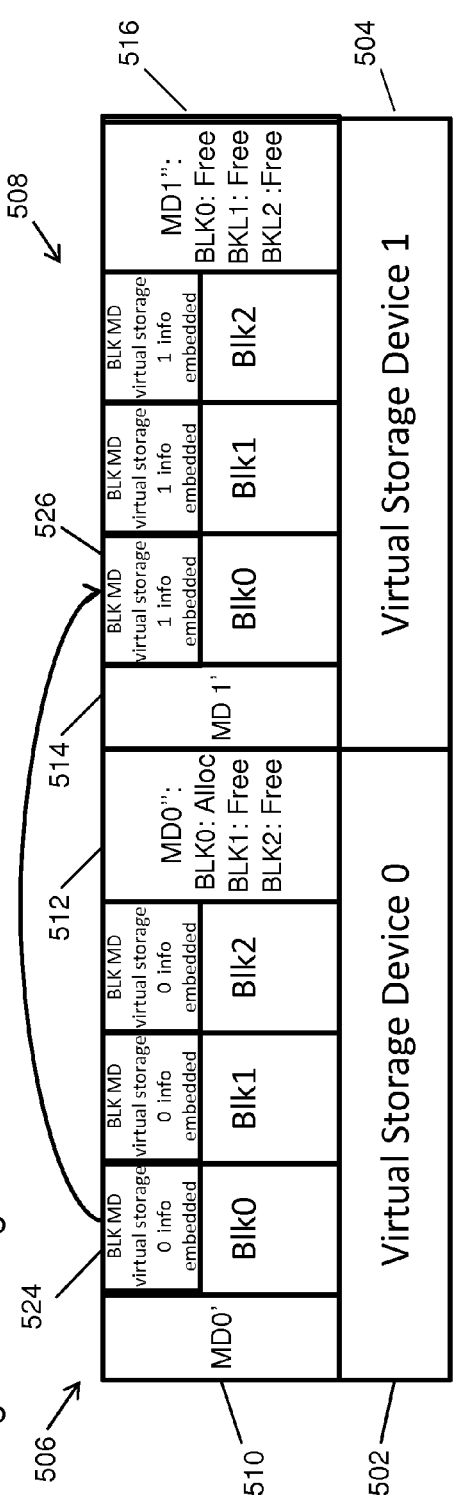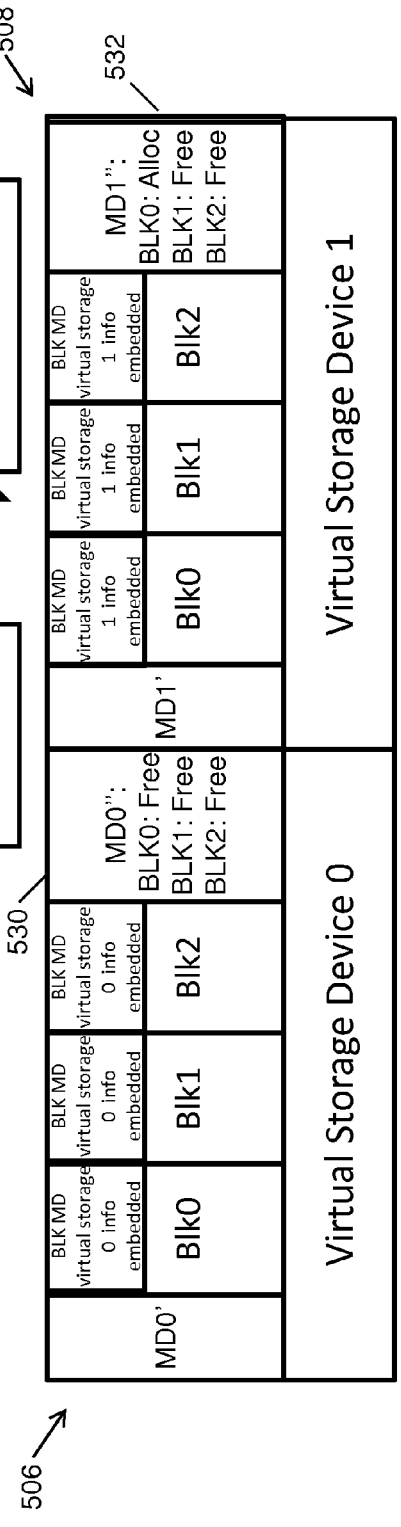
Figure 5A: Migrate Data From Device 0
Figure 5B: Switch Block Mapping
Figure 5C: Remove Device 0

ONLINE REPLACEMENT OF PHYSICAL STORAGE IN A VIRTUAL STORAGE SYSTEM

BACKGROUND

This invention relates generally to data integrity systems used for backup and archiving comprising multiple groups of physical storage devices, e.g., RAID groups, abstracted as virtual storage devices, and more particularly to a method of migrating data and replacing a physical storage device online in such a data integrity system.

Storage systems used for backup and archive of data have architectures that ensure the long term integrity and recoverability of the data. Typically, the storage systems use groups or arrays of physical storage disks organized as RAID groups where data is striped across different physical disks of a RAID group with parity for fault detection and correction. The RAID groups are virtualized by the file system as logical storage devices. The system architecture may also employ data integrity techniques such as only writing to new data blocks and never overwriting data that changes since this can result in accidentally overwriting existing good data and produce data corruption. As a result the storage system size grows continually as new data is written, ultimately necessitating that the storage capacity of the system be increased. Capacity may be increased either by adding additional storage disks to the system, or by increasing the capacity of existing disks through data compression, e.g., data deduplication, and/or disk hardware upgrades. Moreover, sometimes certain types or models of physical disks exhibit reliability problems and need to be replaced.

Disk arrays comprising a collection of physical disks that form a RAID group are generally housed within an enclosure referred to as a "shelf" and associated with a disk controller. The number of physical disks on a shelf depends, in part, upon the level of RAID used in the storage system and the size of the data blocks striped across the disks. RAID 6, for example, is advantageous because it uses block level striping with double distributed parity, and permits data recovery with the loss of two disks. A RAID 6 array may comprise, for instance, twelve to sixteen disks, including two parity disks, and a shelf may have one or more spare disks that can be swapped in place of a failed disk. In the event of a disk upgrade within a disk group, an entire shelf of disks must be replaced with a new shelf, which requires that all data on the disks of the shelf being replaced be migrated to a new shelf, the file system upgraded for the new shelf, and the old shelf physically removed. Many storage systems map disk groups into a single contiguous linear address space. In order to remove and replace a shelf in such systems requires that the system be shut down, the data be moved to a new shelf and the old shelf be removed, and the file system be rebuilt. This can be a complex error prone task. Furthermore, the data migration to the new shelf must be handled in ways which insure data integrity, i.e., that the data is accurately migrated and that data may be recovered in the event of a crash during migration so that no data loss occurs.

It is desirable to provide systems and methods that address the foregoing and other problems with online replacement of physical storage devices in a virtual storage system, including online data migration and data recovery upon a crash, and it is to these ends that the present invention is directed.

BRIEF DESCRIPTION OF THE DRAWINGS

FIG. 4 comprising FIGS. 4A and 4B illustrate a blockset-to-blockset copy of the process of FIG. 3;

FIG. 5 comprising FIGS. 5A, 5B and 5C illustrate an example of a data block migration and shelf removal process in accordance with the invention.

DESCRIPTION OF PREFERRED EMBODIMENTS

This invention is particularly well adapted for use in data integrity storage systems having a plurality of groups of physical storage devices organized in RAID groups as a plurality of separate logical storage devices, and will be described in that context. As will be appreciated, however, this is illustrative of only one utility of the invention.

Figure 1:
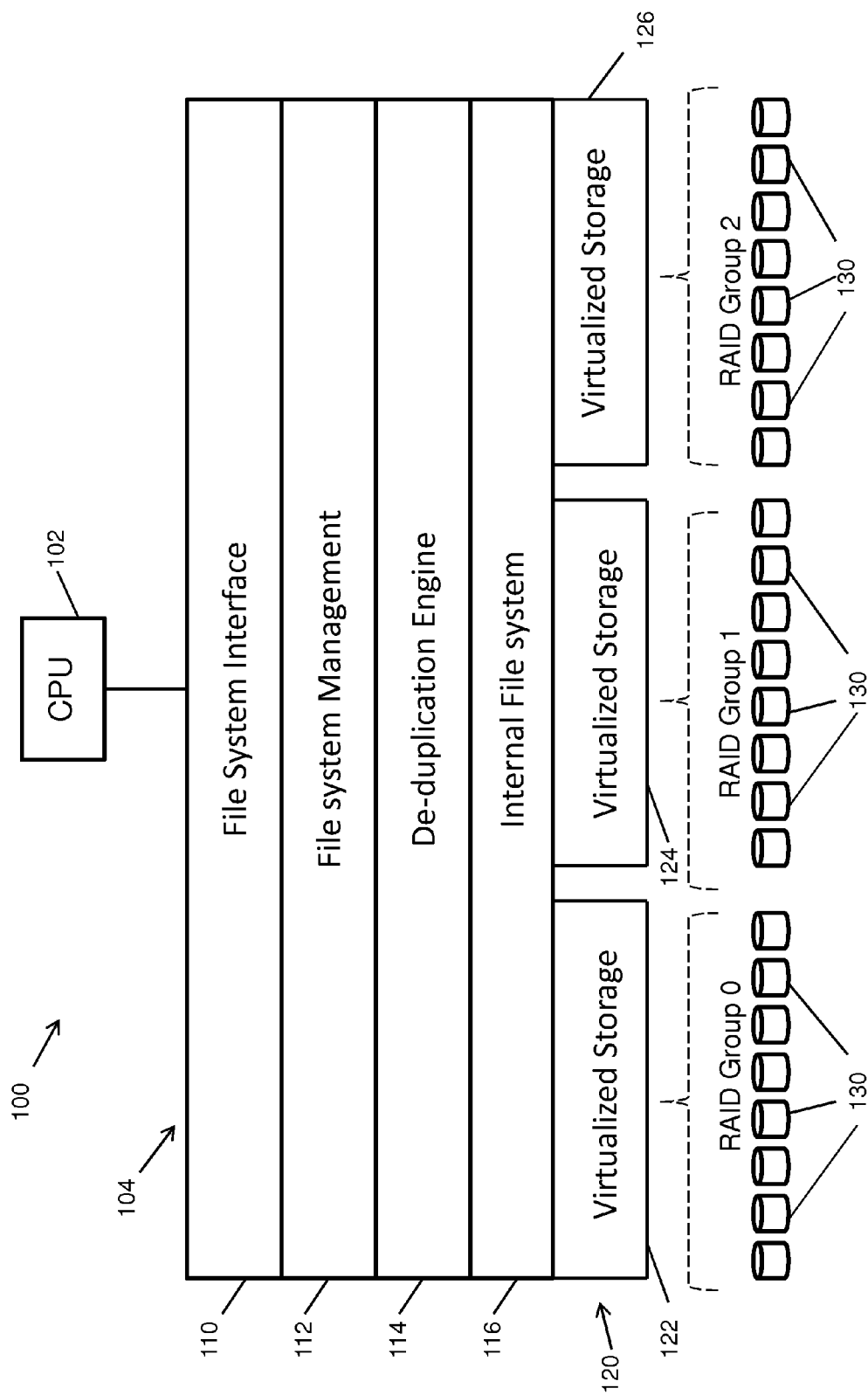
FIG. 1 is a diagrammatic view illustrating the architecture of a multiple virtual storage device file system of the type with which the invention may be employed.

FIG. 1 is a high level overview of a storage system and file system architecture 100 of the type that the invention may be used. As shown a CPU 102 may comprise a memory 104 that embodies data structures comprising software that affords a file system interface 110 by which a user of the system accesses the file system, and a file system management structure 112 that translates file system accesses from the file system interface into appropriate commands and corresponding filenames in the file system namespace. Memory 104 may also include other types of memory such as main system memory comprising non-transitory machine readable media embodying executable instructions for controlling the operations of the CPU to perform operations in accordance with the invention, and may also include non-volatile RAM. The data structures may further provide software comprising a data de-duplication engine 114 which performs a known type of intelligent data compression that that eliminates copies of repeating data to improve utilization of the storage system resources. The data structures further comprise software that provides an internal multiple virtual device file system 116 and a virtualized storage layer 120 comprising a plurality of virtual storage devices 122, 124, 126. The internal multiple virtual device file system defines the internal file structure of the system including the numbers and sizes of data blocks arranged as multiple blocksets corresponding to the virtual storage devices. Each block includes metadata that identifies the location of the block in the logical address space of its blockset, and each blockset includes blockset metadata that defines the location of the blockset in virtualized storage.

The virtualized storage 120 defined by the internal file system in the example shown preferably abstracts a plurality of physical disks 130 in a plurality of RAID disk groups, three such disk groups—Group 0, Group 1 and Group 2 being shown in the figure, into the storage layer as separate logical, i.e., virtual, storage devices 122, 124, 126. As will be described, each virtual storage device has a corresponding blockset comprising a plurality of blocks that store user data and metadata, and each blockset is mapped to its own separate logical address space managed by the internal file system 116. All data in the storage system is accessed from the physical disks via the virtualized storage using the metadata in the blocks of the blockset of the virtual storage device.

Physically, each RAID group (RAID Group 0-RAID Group 2) is located within an enclosure referred to as a "shelf" that houses the physical disks and a controller that forms that RAID group. The disk controllers include software that calculates parity checksums and controls the actual striping of data and parity across the disks of the RAID group. In an embodiment, there may be fourteen disks per each RAID group, twelve for data and two for parity, arranged as a RAID 6 level storage array. This allows recovery of data upon the simultaneous failure of two disks. In one embodiment the physical storage disks may be rotating hard disk drives, and in another embodiment the disks may be solid state storage devices such as flash memory.

As will be described in more detail, the invention enables the online removal and replacement of a physical storage device such as a disk group forming a shelf corresponding to a virtual storage device by migrating the data off of the disks of the shelf to a new device, removing the disk group from the file system, and removing the shelf. In order to remove and replace a shelf of physical disks in a storage system that comprises a plurality of shelves, it is important that the storage system have a multiple virtual device file system, such as described briefly above in connection with FIG. 1, and as will be described in more detail below. Each virtual storage device corresponds to one shelf of physical storage devices that form one RAID group. Each virtual storage device has its own separate independent logical address space that is partitioned into a plurality of data blocks forming a blockset that corresponds to the physical boundaries of the RAID disk group. As indicated above, and as will be described in more detail, this allows the entire shelf (disk group) to be removed and replaced without the necessity of rebuilding the file system. Removal of a storage shelf is not possible in some known backup and archive systems which have a single virtual device file system that abstracts multiple groups of physical devices as one virtual (logical) device in a single contiguous linear address space. In systems having such a single virtual device file system, a shelf cannot be simply removed because there is no straightforward way of migrating the user data and metadata off of the shelf. Removal of the shelf would leave "holes" in the contiguous address space and the system would not function. Thus, in order to replace a physical device or a shelf online in such a storage system having a single virtual device file system, it is necessary to convert the file system to a multiple virtual device file system of the type described herein which abstracts multiple physical storage devices as multiple separate logical storage devices. This conversion may be accomplished as described in commonly assigned co-pending U.S. application Ser. No. 14/281,855, filed May 19, 2014 by the same inventors, entitled "Invulnerable Data Movement for File System Upgrade", the disclosure of which is incorporated by reference herein.

Figure 2:
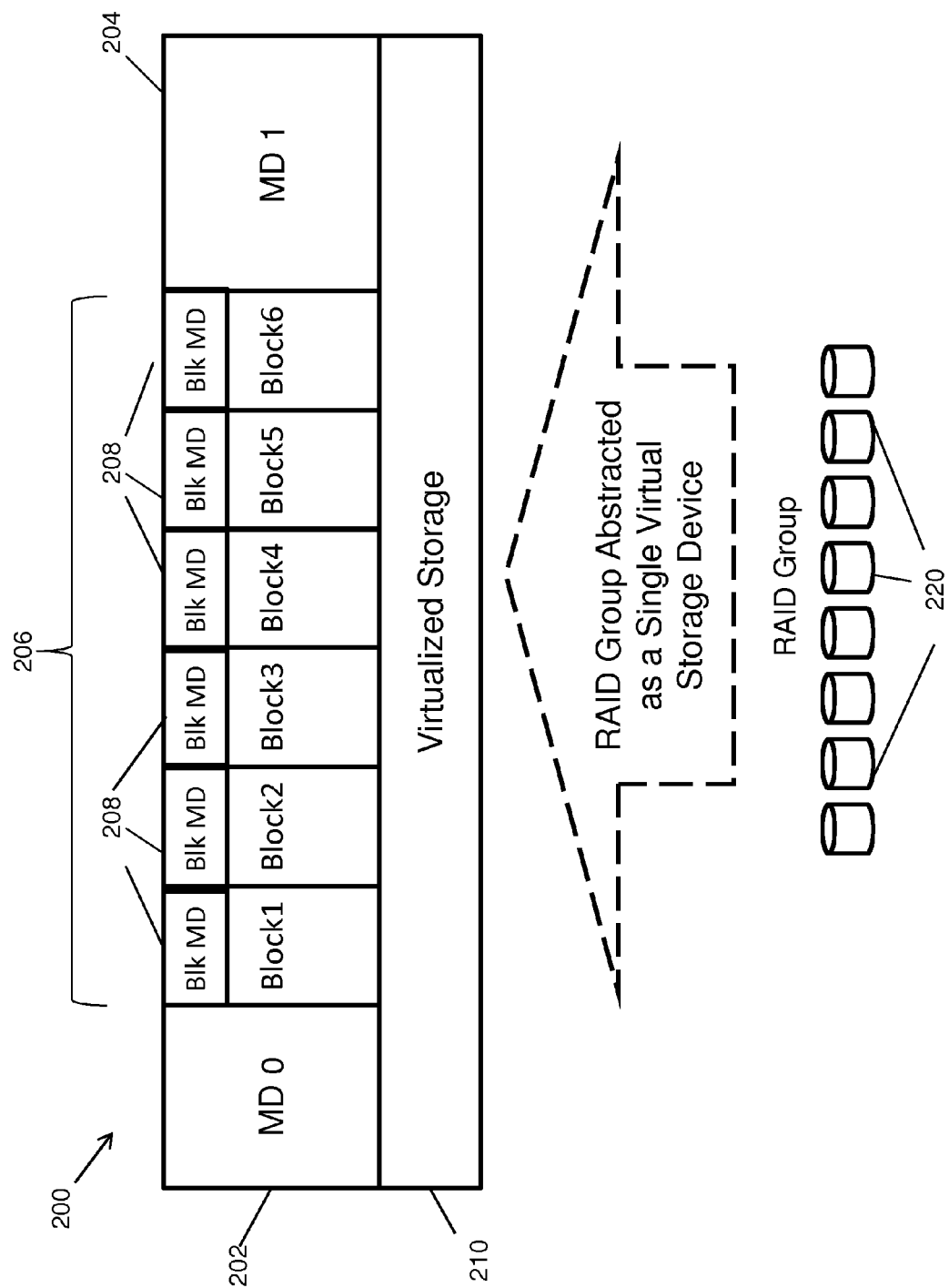
FIG. 2 is a diagrammatic view of the internal file system and virtualized storage of the system of FIG. 1.

FIG. 2 illustrates diagrammatically a portion of the multiple virtual device internal file system architecture of the system of FIG. 1 for one logical (i.e., "virtual") storage device corresponding to a plurality of physical disks in a disk group. As shown, the file system comprises one blockset 200 comprising a blockset header 202 containing first metadata MD 0, a blockset trailer 204 comprising a descriptor table (also referred to as a "D-table") containing second metadata MD 1, and a plurality of data blocks, 206, Block1-Block6 being shown in the figure, corresponding to one RAID disk group (RAID Group). Blockset 200 corresponds to one virtual storage device in a virtualized storage layer 210 that comprises a separate and independent logical address space for the virtual storage device that corresponds to the boundaries of the one RAID Group. The plurality of RAID groups (RAID Group 0-RAID Group 2) shown in FIG. 1, may all be abstracted as separate and independent virtual storage devices in a corresponding virtual storage layer, each managed by the internal multiple virtual device file system.

Each block 206 of the blockset has a block header 208 containing block metadata (Blk MD) that is unique to that block. The block metadata (Blk MD) may comprise, among other things, for instance, a block identifier, an identifier and name of a file to which the block belongs, a checksum for the block data payload, an offset in the virtual device address space of the blockset where the block is written, and the block length. A RAID storage management system may translate this offset to a physical location in a physical storage device.

The blockset header 202 metadata (MD 0) comprises global blockset metadata, that may comprise, for instance, among other things, an offset in the virtual device of the header, the length of the header, a checksum of the header payload, the number of blocks in the blockset, the number of free blocks, the block size, the size of each entry in the descriptor table 204, the file system name and identifier, and an internal file system file table that maps a file identifier (fileid) to the filename.

The metadata in descriptor table (D-table) 204 in contrast may include metadata comprising an index of physical blocks and the mapping for each block. This may include for each block in the blockset, for instance, its offset in the virtual device, its length, a checksum of its payload, an array that represents for each block in the blockset its allocation state (free or allocated), an identifier (fileid) of the file to which it belongs, and a block identifier (ID) of the block. While FIG. 2 may show only six data blocks 206 for blockset 200, it will be appreciated that, in practice, there may be thousand of blocks, all of which are managed by the internal file system.

Figure 3:
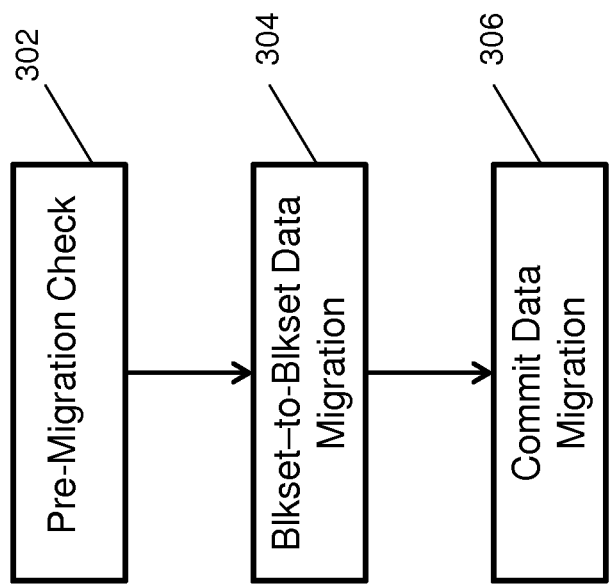
FIG. 3 illustrates an overview of a shelf migration process to move data from a source shelf to a target shelf in accordance with the invention.

FIG. 3 is a high level flow diagram of the principal phases of a shelf migration and replacement process in accordance with the invention. During a pre-migration phase 302, checks are performed to ensure that the system architectural configuration is appropriate for migration of a shelf, and that post-migration configuration will be valid. In order to replace a shelf of disks (an enclosure) it is necessary to move the data off of all of the disks in the disk group (DG) of the shelf being replaced (source shelf) and onto the disks of another disk group on a target shelf in the system, and that the disks of each disk group do not span the physical boundaries of their respective shelves. A shelf migration is actually a blockset migration, since blocksets and DGs have a one-to-one mapping. If all disks of a source shelf are not members of the same disk group, after migration the physical source shelf could not be removed from the system. Rather, one could only remove disks scattered across different shelves unless the various disks were relocated to the source shelf. If there are cross-shelf disk groups in the source or target shelves the pre-migration check will fail. In this event, it will be necessary to physically relocate the odd disks to the correct shelves, or otherwise "fail over" to available drives, if any, on the correct shelves. The pre-migration check verifies that the system configuration is appropriate in advance of actually performing a shelf migration, and may be used as a planning tool for a shelf migration.

The next phase of FIG. 3 is the blockset-to-blockset data migration phase 304 during which actual copying of the data is performed. During this data migration phase, data is migrated block-by-block from a source device and source blockset to a target device and target blockset. Data migration involves actually moving the data from the source physical device to the target physical device and copying the block data from the source blockset to the target blockset. To insure data integrity, this is preferably done using data invulnerability techniques, as will be described, to insure the accuracy of the data and that no data is lost or corrupted. This includes retaining persistent states of the original source data and block metadata after the source data and metadata is moved, until the data migration is verified and committed during a commit phase 306. This allows data migration to be suspended and resumed or interrupted and restarted from the same or an earlier point in the event of a crash. The data migration phase will be described in more detail in connection with FIGS. 4A-B and 5A-C. Following data migration, the block and blockset metadata will be updated for the new configuration. Finally, during the commit phase 306, the data migration may be committed following verification of the correctness of the on-disk data changes, that the correct blocks were relocated and the block headers were correctly updated, and by removing the source shelf and adding the target shelf to the file system.

FIG. 4 comprising FIGS. 4A and 4B illustrates diagrammatically blockset-to-blockset data migration. Source blockset A corresponds to a virtual storage device mapped to a physical disk group that is to be removed from the system. Target blockset B corresponds to a new virtual storage device and to a new disk group that is to replace the virtual storage device and disk group being removed. Target blockset B and the new virtual storage device are created by the internal file system for the new disk group, as described in connection with FIG. 2 and as will be described in more detail below. Each blockset has a plurality of data blocks for user data, and each may have a one or more header blocks (H) and one or more D-table trailer blocks (D) for blockset metadata. The header and trailer metadata may be as previously described. For purposes of illustration, in FIG. 4, source blockset A is shown as having four data blocks 402, 404, 408 and 408 of which blocks 0, 1 and 3 (402, 404 and 408) are allocated (have data) as indicated by the block numbers within the blocks, and data block 406 (block 2) is free (unallocated) as indicated by the designator "F" in the block. Target blockset B is shown as having six data blocks, all of which are free as indicated by "F", as would be the case for a new blockset added by the file system for a new disk group.

As previously described, in order to remove a disk group shelf, it is necessary to perform a shelf migration to move the data on the physical disks of that disk group to other disks in another disk group, and to migrate allocated data blocks of the corresponding blockset to free blocks in another blockset corresponding to the new disk group. As shown in FIG. 4, data in allocated blocks 0, 1 and 3 (402, 404 and 408, respectively) of source blockset A may be migrated to free blocks 0, 1 and 2 (410, 412 and 414, respectively) of target blockset B. This frees all blocks in source blockset A and, after re-mapping the block metadata to blocks in the target blockset B and verifying the data migration, enables the physical disk group shelf and the corresponding source blockset A to be removed from the system.

FIG. 5, comprising FIGS. 5A-C, further illustrates a shelf migration in accordance with the invention. In the example illustrated in the Figures, Virtual Storage Device 0 (502) and Virtual Storage Device 1 (504) are respectively mapped to corresponding blocksets 506 and 508 and managed by the internal file system. In the example, data is migrated from blockset 506 to blockset 508. Accordingly, blockset 506 is a source blockset, and blockset 508 is a target blockset. Each blockset has a separate independent address space, as previously described.

For purposes of illustration, each blockset is shown as having three blocks (Blk 0-Blk 2), although as may be appreciated in practice each may have thousands of blocks. Blockset 506 for Virtual Storage Device 0 may have a header 510 and a trailer 512, respectively containing metadata MD0' and MD0" of the type such as previously described. Similarly, blockset 512 for Virtual Storage Device 1 may have a header 514 and a trailer 516 respectively containing metadata MD1' and MD1". For the example shown in FIG. 5, as indicated in D-table trailers 512 and 518, block Blk0 of blockset 506 is shown as being allocated, and blocks Blk1 and Blk2 are shown as being free, whereas all blocks Blk0-Blk2 of blockset 508 are free. The blocks of both blocksets 506 and 508 also have a block header (e.g., 524 of Blk0 of blockset 506) that contains block metadata (BLK MD) such as described above, that is unique to that block. As previously described, this metadata identifies the block, the file, and the filename to which the block belongs, as well as its offset in the virtual device to which it belongs.

As shown in FIG. 5A by the arrow, the data in allocated block Blk0 of blockset 506 (of Device 0) is migrated to free block Blk0 of blockset 508 (of Device 1). This is done using a data invulnerable data movement to insure the integrity of the data and avoid any data loss or corruption. If there were any other data blocks in blockset 506 that were allocated, they would be similarly moved to blockset 508.

As indicated in FIG. 5B, following data migration block mappings are updated in the block headers. As shown, a file "A" that was in block Blk0 of blockset 506 is re-mapped following migration to block Blk0 of Device 1. This is done by updating the metadata in block headers 524 and 526 so that the file system will be able to locate file A. Additionally, the blockset metadata in the headers and trailers of the blocksets will be updated by the file system. As shown in FIG. 5C, the metadata in D-table 512 of blockset 506 of Virtual Storage Device 0 (502) will be updated as shown at 530 to indicate that all blocks of blockset 506 are "Free", and the metadata in the D-table 518 of blockset 508 will be updated as shown at 532 to indicate that block Blk0 of blockset 508 is allocated and the other blocks are still free. At this point all of the allocated blocks (Blk 0) of the source blockset have been migrated to the target blockset, and all blocks of the source blockset are free. This permits physical storage device shelf 0 that was originally mapped to blockset 506 to be removed from the system upon commitment of the data migration. It should be noted that blockset 508 and Virtual Storage Device 1 may be a completely new shelf of disks that was added to the system to replace the shelf being removed. Alternatively, it is possible to evacuate the data on a source shelf that is to be removed and migrate it to free space on an existing "target" shelf if sufficient space is available on that shelf to accommodate the evacuated data. In this event, data in allocated blocks of the source shelf blockset can be simply migrated to unallocated blocks of the target shelf and the physical source shelf removed. It is unnecessary to add a new target shelf.

Advantageously, shelf migration may be performed with the system online, avoiding system down time. Shelf migration, however, may also be performed offline if desired. To avoid any data loss from new writes during shelf migration, any writes to disks in the disk group of the source shelf being migrated may be written to a buffer instead of the actual disks of the source shelf, and atomically transferred to the disks of the target shelf as part of the commitment process.

As stated above, data movement preferably is done using a data invulnerability approach that insures that data is moved in a way that minimizes the possibility of loss or corruption, and by maintaining copies of the data that may be used for restoration of the data. As an overview, in the invulnerable data movement phase, the user data portion of each data block may be first moved to a new block in the target blockset. Next, the metadata portion of the data block may be moved and upgraded for the new data block; and finally the file system blockset metadata may be upgraded. The source data on disk is protected by using RAID reads that verify the P/Q RAID 6 checksum and recover any corruption, if needed. The data migration from a source disk on a source shelf to a destination disk on a target shelf may be protected by a read-verify-after-write procedure, where the data is first read and written into nonvolatile system buffer memory from which it is written onto the system disks. The disk data may be read back and compared to the data in buffer memory to verify that it is correct. If the read verify procedure detects corruption, data can be recovered by retrying the data movement. If any crashes occur during this movement, the file system can restart in its previous state and any required data movement can be redone. If there is any corruption in the file system blockset metadata after a crash, the file system can rebuild the metadata from the copy residing in the various data blocks, and restart the process.

All data blocks are self-descriptive. They have a header, e.g., 524, 526, containing block metadata ("BLK MD"), which describes the block's location in virtual storage with a checksum for the data payload, enabling corruption to be detected upon a read. The blocksets 506, 508 also have a header, e.g., 510, 514, and a D-table, e.g., 512, 518, containing file system blockset metadata. This blockset metadata may be as previously described, and includes block metadata for the blocks of the blockset. Thus, there is metadata redundancy in the system. There are three copies of block metadata in the file system that can be used for restoring block metadata in the event of a crash or data corruption, i.e., one set in each block, and one set each in the header and the D-table of the blockset containing that block.

Figure 6:
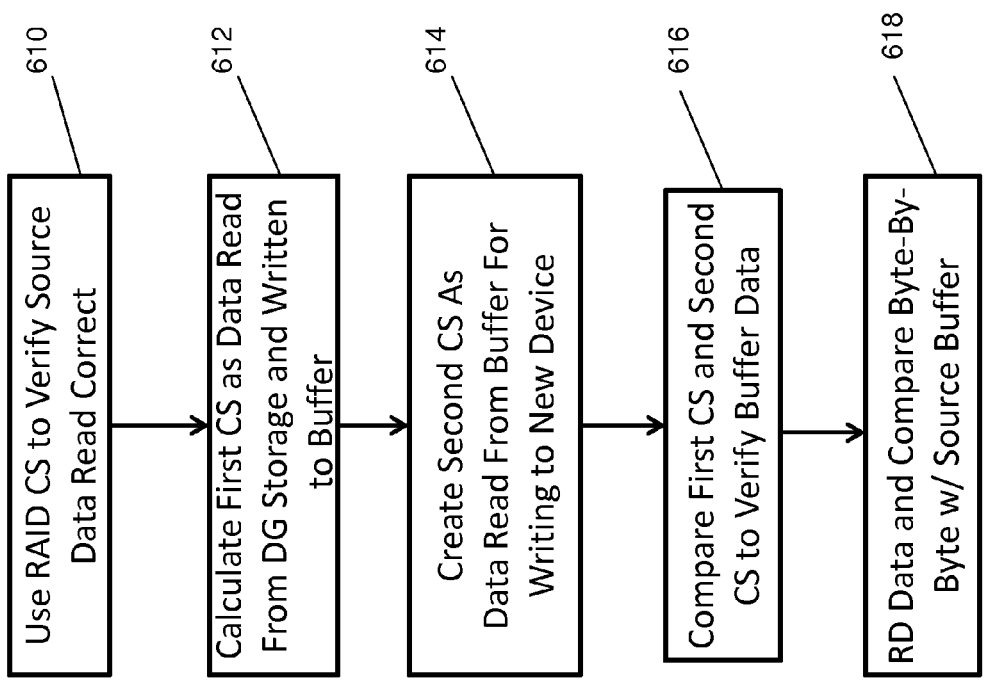
FIG. 6 is an overview of an invulnerable data movement process in accordance with the invention.

FIG. 6 illustrates the invulnerable data migration process in more detail. As shown in FIG. 6, at 610 source data read from disk is verified as being correct using the RAID parity checksum (CS). At 612, as the data is read from disk and written to system buffer memory (e.g., non-volatile RAM), a first checksum, e.g., a hash, may be calculated. As the data is read from the buffer memory at 614 for writing to a new device, a second checksum may be created and compared at 616 with the first checksum to ensure the data was written correctly. At 618, the data written to the new device may be read and compared byte-by-byte with the source buffer to insure that the data was written correctly to the new device. This read verification post write also allows lost writes to be detected and redone.

As may be appreciated from the foregoing, the invention advantageously enables a data integrity backup and archive system to be upgraded and expanded online by removing and adding disk group shelves, as desired. Moreover, since each shelf corresponds to one virtual storage device that is mapped to a separate, independent blockset and address space, shelf or device replacement can be done without the necessity of rebuilding the internal file system. Accordingly, the invention enables more efficient system management and better tailoring of the system to changing needs.

While the foregoing has been with reference to particular embodiments of the invention, it will be appreciated that changes may made to these embodiments without departing from the principles and spirit of the invention, the scope of which is set out in the appended claims.

The invention claimed is:

1. A method of replacing physical storage online in a storage system having an internal file system, comprising:

mapping, by said internal file system, a plurality of physical storage disks of a storage shelf to a separate independent logical address space partitioned into a plurality of blocks forming a blockset, each of said blocks containing data and block metadata, said blockset corresponding to a virtual storage device;

migrating a source shelf while said storage system is online by moving data from the physical storage disks of the source shelf and from source blocks of a corresponding source blockset to storage disks of a target shelf and to target blocks of a corresponding target blockset, respectively;

updating block metadata of said target blocks to reference said corresponding target blockset; and committing said migrating by removing said source shelf from said storage system and said source blockset from said internal file system.

2. The method of claim 1 further comprising verifying the correctness of the data moved to the target shelf and target blockset prior to said removing said source shelf and source blockset.

3. The method of claim 2, wherein said verifying comprises reading data from source disks of the source shelf and writing said data into a buffer memory, calculating a first checksum of said data as read, further writing the data in said buffer memory to target disks of said target shelf, calculating a second checksum of the data written to the target disks, and comparing said first and second checksums to verify the data written to the target disks.

4. The method of claim 3, wherein said source disks are part of a RAID group, and the method further comprises comparing said first checksum with parity information of said RAID group to verify the correctness of the data written to the buffer memory.

5. The method of claim 1, wherein said mapping comprises mapping all of the storage disks of the source shelf and the target shelf to a corresponding RAID group and to a corresponding logical address space of each shelf.

6. The method of claim 5 further comprising executing a pre-migration check prior to said migrating to verify that none of the disks of said each shelf span a physical boundary of said each shelf.

7. The method of claim 1 further comprising creating a target disk group of all of the storage disks of said target shelf, exposing said target disk group to said file system, and creating by said file system said target blockset for said target disk group.

8. The method of claim 1, wherein said migrating comprises migrating data from source blocks of said source blockset to corresponding target blocks of said target blockset, and said updating block metadata comprises updating said block metadata of said target blocks to reference a mapping of said each target block to an offset in a logical address space of said target blockset.

9. The method of claim 8, wherein said migrating data from said source blocks comprising moving data only from allocated source blocks to free target blocks.

10. The method of claim 1, wherein said removing comprises removing the source shelf after moving all data from said source shelf to said target shelf and verifying the correctness of the moved data.

11. The method of claim 1, wherein said block metadata includes a block identifier and an offset of the block in a corresponding blockset.

12. The method of claim 1, wherein each blockset has a header comprising blockset metadata that includes information identifying each block of said blockset and an offset of the block in a corresponding virtual storage device.

13. Non-transitory computer readable media storing instructions for controlling the operation of a computer to perform a method of replacing physical storage online in a storage system having an internal file system, comprising instructions for:

mapping a plurality of physical storage disks of a storage shelf to a separate independent logical address space partitioned into a plurality of blocks forming a blockset, each of said blocks containing data and block metadata, said blockset corresponding to a virtual storage device;

migrating a source shelf while said storage system is online by moving data from the physical storage disks of the source shelf and from source blocks of a corresponding source blockset to storage disks of a target shelf and to target blocks of a corresponding target blockset, respectively;

updating block metadata of said target blocks to reference said corresponding target blockset; and committing said migrating by removing said source blockset and a corresponding virtual storage device from said internal file system.

14. Non-transitory computer readable media of claim 13, wherein said instructions for mapping comprise instructions for mapping all of the storage disks of the source shelf and the target shelf to a corresponding RAID group and to a corresponding logical address space of each shelf.

15. Non-transitory computer readable media of claim 13 further comprising instructions for executing a pre-migration check prior to said migrating to verify that none of the disks of said each shelf span a physical boundary of said each shelf.

16. Non-transitory computer readable media of claim 13 further comprising instructions for creating a target disk group of all of the storage disks of said target shelf, exposing said target disk group to said file system, and creating by said file system said target blockset for said target disk group.

17. Non-transitory computer readable media of claim 13, wherein said instructions for migrating comprise instructions for migrating data from source blocks of said source blockset to corresponding target blocks of said target blockset, and instructions for updating said block metadata of said target blocks to reference a mapping of said each target block to an offset in a logical address space of said target blockset.

\* \* \* \* \*